(12) United States Patent
Marchlewski et al.

(10) Patent No.: US 10,967,913 B2
(45) Date of Patent: Apr. 6, 2021

(54) DETACHABLE QUARTER PANEL BRACKET

(71) Applicant: Ford Global Technologies, LLC, Dearborn, MI (US)

(72) Inventors: Jack Marchlewski, Saline, MI (US); Darrin Neil Wagner, Bloomfield Hills, MI (US); Robert Reiners, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 118 days.

(21) Appl. No.: 16/553,609

(22) Filed: Aug. 28, 2019

(65) Prior Publication Data

US 2021/0061364 A1 Mar. 4, 2021

(51) Int. Cl.
*B60R 19/34* (2006.01)
*B62D 25/08* (2006.01)
*B60K 35/00* (2006.01)

(52) U.S. Cl.
CPC .............. *B62D 25/08* (2013.01); *B60K 35/00* (2013.01); *B60K 2370/179* (2019.05)

(58) Field of Classification Search
CPC .......... A47G 1/162; A63C 3/04; B24B 23/06; B60R 9/06; E05Y 2201/64; E05Y 2900/531; B62D 25/087; B62D 25/04; B62D 25/2036; E05F 15/646

See application file for complete search history.

(56) References Cited

U.S. PATENT DOCUMENTS

| | | | | |
|---|---|---|---|---|
| 3,671,002 A | * | 6/1972 | Elliott | H02G 7/20 248/300 |
| 3,839,605 A | * | 10/1974 | Morrell | H04M 1/23 379/369 |
| 4,757,653 A | * | 7/1988 | Anderholm | E04F 11/00 52/182 |
| 5,292,009 A | * | 3/1994 | Smith | B62H 3/00 211/19 |
| 6,152,204 A | * | 11/2000 | Santoro | A47H 2/00 160/19 |
| 7,651,133 B2 | * | 1/2010 | Branning | B62D 21/14 280/785 |
| 8,888,171 B2 | | 11/2014 | Green | |
| 8,998,261 B2 | * | 4/2015 | Downie | B25J 18/00 280/801.2 |
| 9,151,098 B2 | * | 10/2015 | Yamada | B60J 5/047 |

(Continued)

*Primary Examiner* — Kiran B Patel
(74) *Attorney, Agent, or Firm* — David Coppiellie; Carlson, Gaskey & Olds, P.C.

(57) ABSTRACT

An apparatus, according to an exemplary aspect of the present disclosure includes, among other things, a bracket having a first attachment feature configured for attachment to a quarter panel and a second attachment feature configured for attachment to a body inner structure. A BLIS module attaches to the body inner structure without covering the first attachment feature. A method according to an exemplary aspect of the present disclosure includes, among other things, attaching a quarter panel to a bracket via a first attachment feature, attaching the quarter panel with the bracket to a body inner structure, attaching the bracket to the body inner structure via a second attachment feature, and attaching a BLIS module to the body inner structure without covering the first attachment feature.

20 Claims, 3 Drawing Sheets

(56) References Cited

U.S. PATENT DOCUMENTS

| | | | |
|---|---|---|---|
| 9,321,417 B1* | 4/2016 | Lepper | B60R 21/201 |
| 9,511,711 B2 | 12/2016 | Petrillo et al. | |
| 9,601,908 B2* | 3/2017 | Merritt | H02G 3/045 |
| 10,914,448 B2* | 2/2021 | Marchlewski | B60Q 1/2649 |
| 2006/0113821 A1* | 6/2006 | Yokomori | B60J 5/06 |
| | | | 296/155 |
| 2006/0163913 A1 | 7/2006 | Gammon et al. | |
| 2008/0315050 A1 | 12/2008 | Buckley et al. | |
| 2014/0152051 A1* | 6/2014 | Saitou | B62D 25/08 |
| | | | 296/187.09 |
| 2014/0319880 A1* | 10/2014 | Shigihara | B62D 21/03 |
| | | | 296/193.09 |
| 2017/0158263 A1* | 6/2017 | Kojo | B62D 43/10 |
| 2018/0297642 A1* | 10/2018 | Kudoh | B62D 25/087 |
| 2019/0084396 A1* | 3/2019 | Suzuki | B62D 21/152 |
| 2020/0189491 A1* | 6/2020 | Marchlewski | F16B 5/065 |
| 2020/0217478 A1* | 7/2020 | Marchlewski | B60Q 1/2638 |
| 2020/0262485 A1* | 8/2020 | Hida | B62D 27/02 |

* cited by examiner

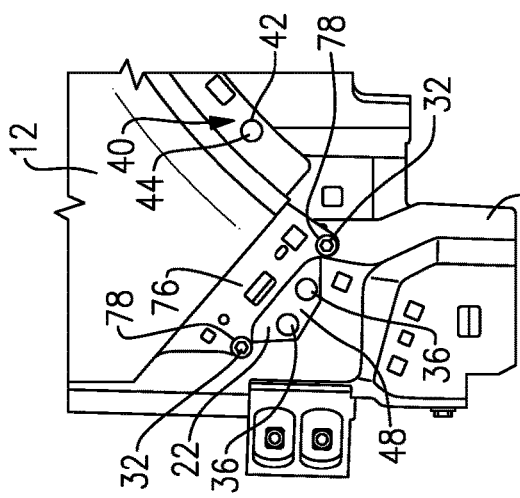
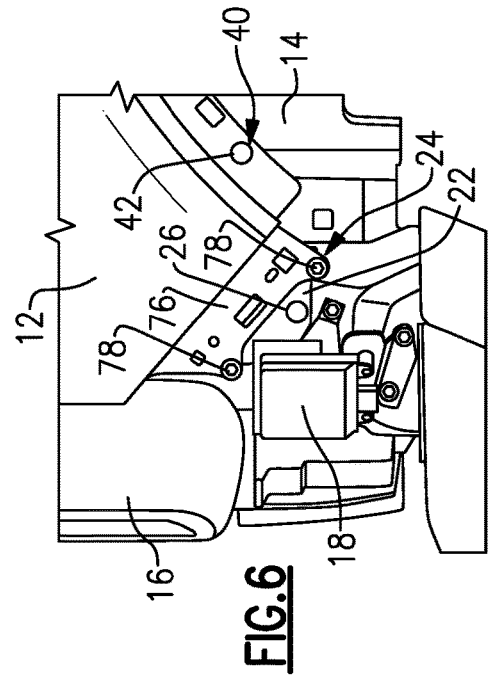
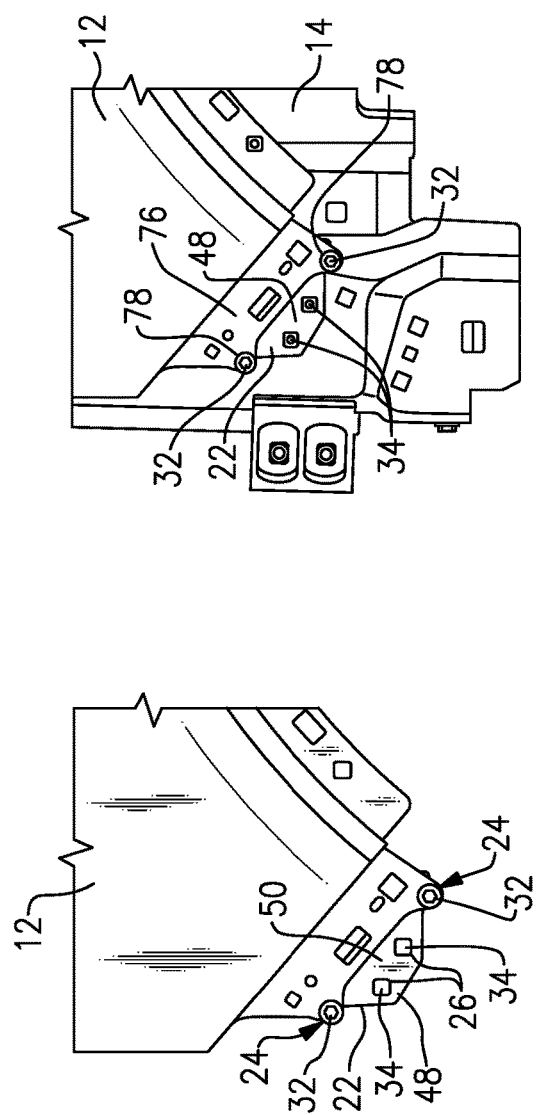
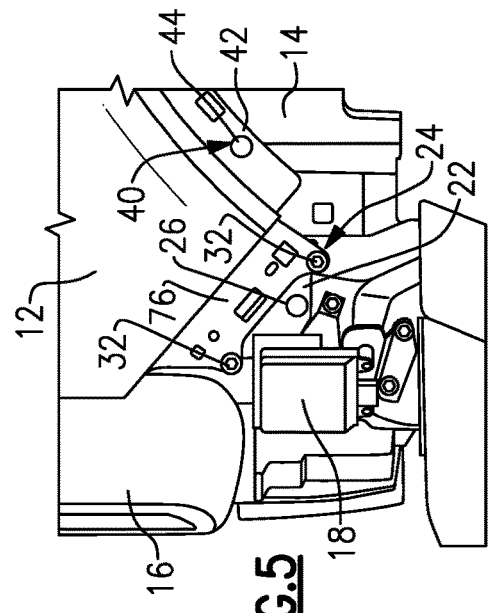

DETACHABLE QUARTER PANEL BRACKET

TECHNICAL FIELD

This disclosure relates generally to a quarter panel bracket that allows for quarter panel replacement without having to remove a sensor module positioned near the bracket.

BACKGROUND

A quarter panel for a vehicle is installed on a body inner structure via a bracket and fasteners. A Blind Spot Monitoring System (BLIS) module is also installed at the quarter panel location and blocks access to the fasteners that attach the quarter panel to the body inner structure. To remove the quarter panel for replacement, the BLIS module must also be removed which is not desirable.

SUMMARY

An apparatus according to an exemplary aspect of the present disclosure includes, among other things, a bracket having a first attachment feature configured for attachment to a quarter panel and a second attachment feature configured for attachment to a body inner structure. A BLIS module attaches to the body inner structure without covering the first attachment feature.

In a further non-limiting embodiment of the foregoing apparatus, the first attachment feature comprises one or more first holes configured to receive one or more first fasteners to secure the bracket to the quarter panel.

In a further non-limiting embodiment of any of the foregoing apparatus, the second attachment feature comprises one or more second holes configured to receive one or more second fasteners to secure the bracket to the body inner structure.

In a further non-limiting embodiment of any of the foregoing apparatus, the first attachment feature comprises one or more first holes configured to receive one or more first fasteners to secure the bracket to the quarter panel, and wherein the second attachment feature comprises one or more second holes configured to receive one or more second fasteners to secure the bracket to the body inner structure.

In a further non-limiting embodiment of any of the foregoing apparatus, the first holes comprise at least two first holes that are axially spaced apart from each other, and wherein the second holes are located axially between the at least two first holes.

In a further non-limiting embodiment of any of the foregoing apparatus, the quarter panel includes a third attachment feature configured for attachment to the body inner structure, and wherein the quarter panel can be removed from the bracket and the body inner structure without having to remove the bracket from the body inner structure.

In a further non-limiting embodiment of any of the foregoing apparatus, the BLIS module covers at least a portion of the second attachment feature.

In a further non-limiting embodiment of any of the foregoing apparatus, the bracket comprises a flat body portion extending between first and second end portions and with an enlarged central portion between the first and second end portions, and wherein the bracket includes an elongated flange portion having a first flange end portion and a second flange end portion opposite the first flange end portion, and wherein the elongated flange portion extends outwardly of the flat body portion along one edge of the flat body portion between the first and second end portions.

In a further non-limiting embodiment of any of the foregoing apparatus, the first attachment feature comprises at least two first holes and the second attachment feature comprises at least two second holes, and wherein one first hole is located at the first flange end portion, another first hole is located at the second flange end portion, and the at least two second holes are located in the enlarged central portion of the flat body portion.

An apparatus, according to yet another exemplary aspect of the present disclosure includes, among other things, a body inner structure, a quarter panel attached to the body inner structure, a bracket having at least one first hole to receive a first fastener to attach the bracket to the quarter panel and at least one second hole to receive a second fastener to attach the bracket to the body inner structure, and a BLIS module attached to the body inner structure without covering the first fastener.

In a further non-limiting embodiment of any of the foregoing apparatus, the at least one first hole comprises at least two first holes that receive first fasteners to secure the bracket to the quarter panel, and wherein the at least one second hole comprises at least two second holes that receive second fasteners to secure the bracket to the body inner structure.

In a further non-limiting embodiment of any of the foregoing apparatus, the bracket comprises a flat body portion extending between first and second end portions and with an enlarged central portion between the first and second end portions, and wherein the bracket includes an elongated flange portion having a first flange end portion and a second flange end portion opposite the first flange end portion, and wherein the elongated flange portion extends outwardly of the flat body portion along one edge of the flat body portion between the first and second end portions.

In a further non-limiting embodiment of any of the foregoing apparatus, the first attachment feature comprises at least two first holes and the second attachment feature comprises at least two second holes, and wherein one first hole is located at the first flange end portion, another first hole is located at the second flange end portion, and the at least two second holes are located in the enlarged central portion of the flat body portion.

In a further non-limiting embodiment of any of the foregoing apparatus, the quarter panel can be removed from the bracket and the body inner structure without having to remove the bracket from the body inner structure.

In a further non-limiting embodiment of any of the foregoing apparatus, the BLIS module covers at least a portion of the second attachment feature.

A method according to still another exemplary aspect of the present disclosure includes, among other things, attaching a quarter panel to a bracket via a first attachment feature, attaching the quarter panel with the bracket to a body inner structure, attaching the bracket to the body inner structure via a second attachment feature, and attaching a BLIS module to the body inner structure without covering the first attachment feature.

In a further non-limiting embodiment of the foregoing method, the method includes, subsequent to step (d), removing the quarter panel from the body inner structure without having to remove the BLIS module from the body inner structure.

In a further non-limiting embodiment of any of the foregoing methods, step (a) further includes forming the first attachment feature as at least two first holes to receive first fasteners to attach the bracket to the quarter panel, and step (c) further includes forming the second attachment feature as at least two second holes to receive second fasteners to attach the bracket to the body inner structure.

In a further non-limiting embodiment of any of the foregoing methods, the method includes forming the bracket as a flat body portion extending between first and second end portions and with an enlarged central portion between the first and second end portions, and forming the bracket with an elongated flange portion having a first flange end portion and a second flange end portion opposite the first flange end portion, and such that the elongated flange portion extends outwardly of the flat body portion along one edge of the flat body portion between the first and second end portions.

In a further non-limiting embodiment of any of the foregoing methods, the method includes forming one first hole at the first flange end portion, forming another first hole at the second flange end portion, and the positioning the at least two second holes in the enlarged central portion of the flat body portion.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 2 is a top view of a quarter panel and bracket.

FIG. 3 is a top view of the quarter panel and bracket of FIG. 2 overlaying a body inner structure.

FIG. 4 is a top view of the quarter panel and bracket of FIG. 2 as attached to the body inner structure.

FIG. 5 is a view similar to FIG. 4 with the addition of the BLIS module installed to the body inner structure.

FIG. 6 is a view similar to FIG. 5 but showing fasteners removed from the bracket and quarter panel attachment interface.

DETAILED DESCRIPTION

This disclosure details, among other things, an exemplary detachable quarter panel location bracket. The disclosed bracket allows for quarter panel replacement without having to remove a blind spot monitoring sensor module mounted at the same location.

Figure 1:
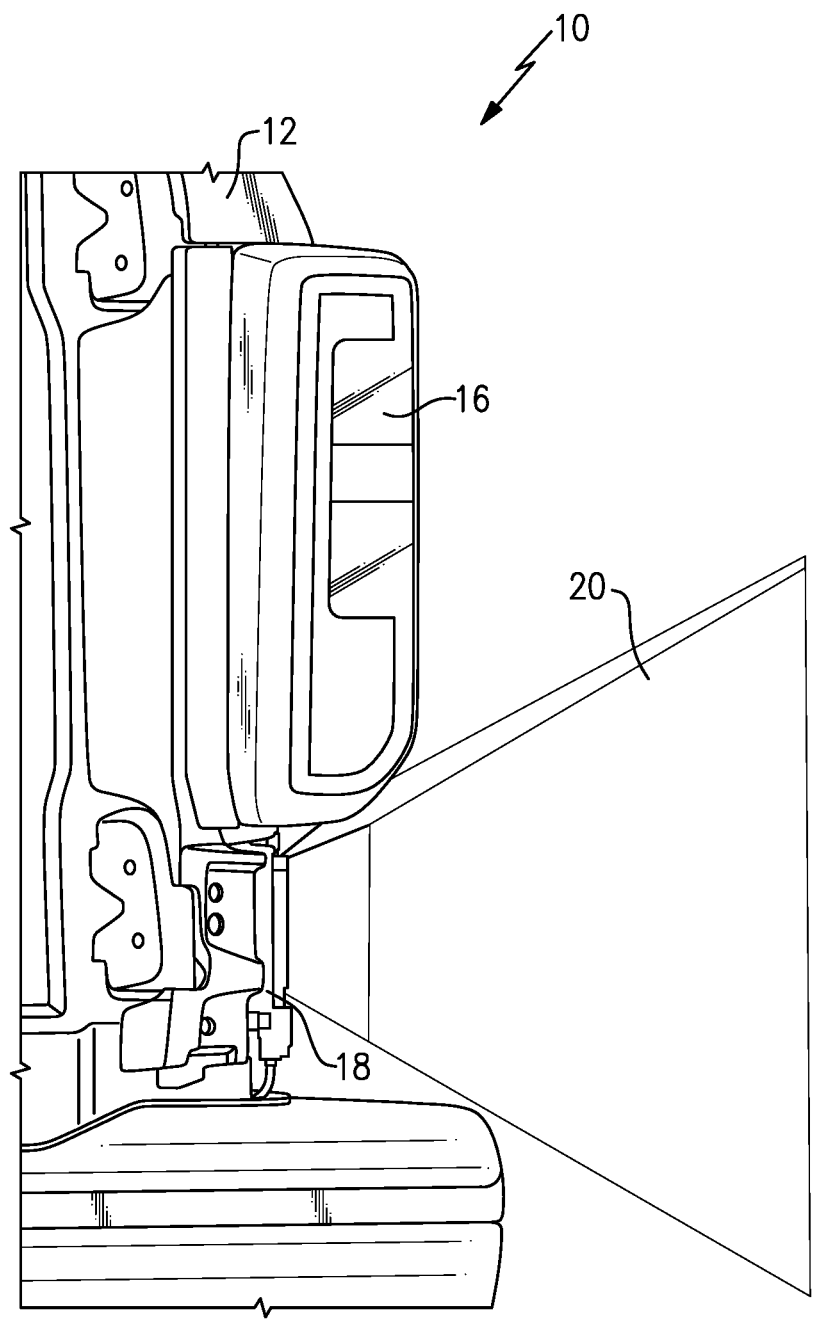
FIG. 1 illustrates a perspective view of a vehicle quarter panel with tail light and BLIS sensor module.

FIG. 1 shows a vehicle 10 having a quarter panel 12 installed on a body inner structure 14. Just below a tail light 16 and at a rear quarter location on the vehicle 10, a Blind Spot Monitoring System (BLIS) module 18 is installed on the body inner structure 14. Typically, the BLIS includes modules located at rear corners of the vehicle 10 such that RADAR cones 20 generated by the modules are unobstructed at various angles.

For sport utility vehicles, such as vehicles that go off-road for example, it is often desirable to replace quarter panels that may become dented during off-roading. Current configurations require the BLIS module 18 to be removed from the vehicle 10 before the quarter panel 12 can be removed and replaced, which is not desirable. FIGS. 2-7 disclose a bracket 22 that allows for quarter panel replacement without having to remove the BLIS module 18.

The bracket 22 has a first attachment feature 24 configured for attachment to the quarter panel 12 and a second attachment feature 26 configured for attachment to the body inner structure 14. The BLIS module 18 attaches to the body inner structure 14 without covering the first attachment feature 24.

In one example, the first attachment feature 24 comprises one or more first holes 30 (FIG. 7) configured to receive one or more first fasteners 32 to secure the bracket 22 to the quarter panel 12. In one example, the second attachment feature 26 comprises one or more second holes 34 configured to receive one or more second fasteners 36 to secure the bracket 22 to the body inner structure 14. In one example, the first holes 30 comprise at least two first holes 30 that are axially spaced apart from each other and the second holes 34 are located axially between the at least two first holes 30. The second holes 34 comprise clearance holes in the detachable bracket 22 to allow for fixture setting of the quarter panel 12.

Figure 7:
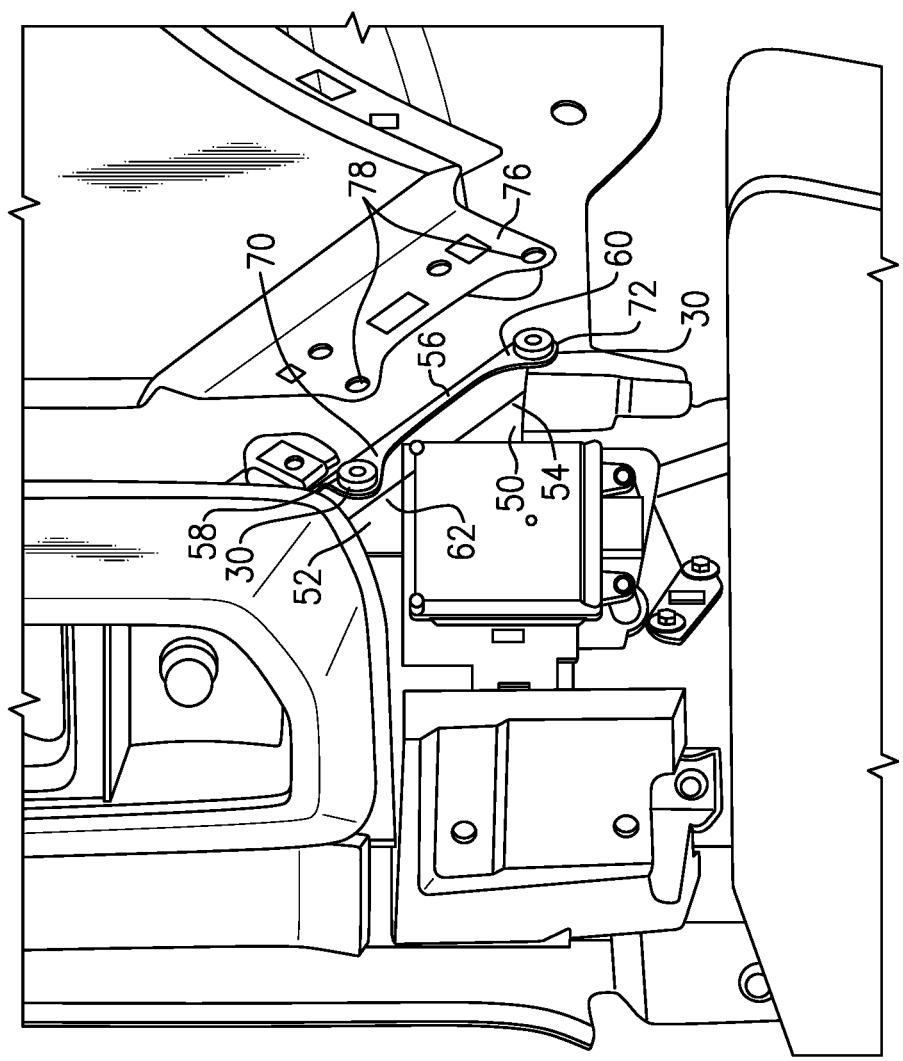
FIG. 7 is a perspective view showing the quarter panel being removed from the body inner structure without having to remove the BLIS from the body inner structure.

As shown in FIG. 4, the quarter panel 12 includes a third attachment feature 40 configured for attachment to the body inner structure 14. The quarter panel 12 can be removed from the bracket 22 and the body inner structure 14 without having to remove the bracket 22 from the body inner structure 14 (FIGS. 6-7). In one example, the third attachment feature 40 comprises one or more additional holes 42 that receive fasteners 44 to secure the quarter panel 12 to the inner body structure 14.

In one example, the BLIS module 18 covers at least a portion of the second attachment feature 26. For example, as shown in FIG. 5, the BLIS module 18 covers one of the second fasteners 36 but does not cover either of the first fasteners 32. Thus, the quarter panel 12 can be removed from the inner body structure 14 and bracket 22 without having to remove the bracket 22 or BLIS module 18 from the inner body structure 14.

In one example, the bracket 22 comprises a flat body portion 50 (FIG. 7) extending between first 52 and second 54 end portions. An enlarged central portion 48 (FIG. 2) is located between the first 52 and second 54 end portions. The bracket 22 includes an elongated flange portion 56 having a first flange end portion 58 and a second flange end portion 60 opposite the first flange end portion 58. The elongated flange portion 56 extends outwardly of the flat body portion 50 along one edge 62 of the flat body portion 50 between the first 52 and second 54 end portions. In one example, the elongated flange portion 56 defines a planar surface that is transverse to a planar surface defined by the flat body portion 50. In one example, the elongated flange portion 56 is orientated ninety degrees relative the flat body portion 50, i.e. the elongated flange portion 56 is generally perpendicular to the flat body portion 50.

In one example, the first attachment feature 24 comprises at least two first holes 30 for the first fasteners 32 and the second attachment feature 26 comprises at least two second holes 34 for the second fasteners 36. One first hole 30 is located at the first flange end portion 58, another first hole 30 is located at the second flange end portion 60, and the two second holes 34 are located in the enlarged central portion 48 of the flat body portion 50. In one example, the first flange end portion 58 includes a first transversely extending flange or boss 70 that extends downwardly from an edge of the elongated flange portion 56, and the second flange end portion 60 includes a second transversely extending flange or boss 72 that extends downwardly from an edge of the elongated flange portion 56. The first transversely extending flange or boss 70 includes one first hole 30 and the second transversely extending flange or boss 72 includes the other first hole 30. In one example, the first 70 and second 72 bosses extend generally parallel to the flat body portion 50.

As shown in FIG. 7, the quarter panel 12 includes a flange portion 76 that includes one or more additional holes 78. These additional holes 78 comprise sized locator holes for panel reinstallation to the factory installed position. The additional holes 78 are aligned with the first holes 30 in the first and second transversely extending flanges 70, 72 to attach the quarter panel 12 to the bracket 22.

To remove the quarter panel 12, the first fasteners 32 are removed and the quarter panel 12 can be lifted away from the body inner structure 14 as shown in FIG. 7. The bracket 22 remains in place as a locating feature via the second fasteners 36 and the BLIS module 18 does not have to be disturbed. Because the quarter panel attachment flange 76 uses sized holes 78, the detachable bracket 22 also provides quarter panel relocation to the factory installed position when reinstalled.

The disclosed bracket 22 provides the desired fixturing and assembly sequencing of the removable quarter panel and BLIS module, but allows removal of the quarter panel without having to disconnect or remove the BLIS module. The sized holes in the quarter panel for the originally installed fasteners allows the quarter panel to be reinstalled in the factory set position.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
   a bracket having a first attachment feature configured for attachment to a quarter panel and a second attachment feature configured for attachment to a body inner structure; and
   a BLIS module that attaches to the body inner structure without covering the first attachment feature.

2. The apparatus according to claim 1, wherein the first attachment feature comprises one or more first holes configured to receive one or more first fasteners to secure the bracket to the quarter panel.

3. The apparatus according to claim 1, wherein the second attachment feature comprises one or more second holes configured to receive one or more second fasteners to secure the bracket to the body inner structure.

4. The apparatus according to claim 1, wherein the first attachment feature comprises one or more first holes configured to receive one or more first fasteners to secure the bracket to the quarter panel, and wherein the second attachment feature comprises one or more second holes configured to receive one or more second fasteners to secure the bracket to the body inner structure.

5. The apparatus according to claim 4, wherein the first holes comprise at least two first holes that are axially spaced apart from each other, and wherein the second holes are located axially between the at least two first holes.

6. The apparatus according to claim 1, wherein the quarter panel includes a third attachment feature configured for attachment to the body inner structure, and wherein the quarter panel can be removed from the bracket and the body inner structure without having to remove the bracket from the body inner structure.

7. The apparatus according to claim 1, wherein the BLIS module covers at least a portion of the second attachment feature.

8. The apparatus according to claim 1, wherein the bracket comprises a flat body portion extending between first and second end portions and with an enlarged central portion between the first and second end portions, and wherein the bracket includes an elongated flange portion having a first flange end portion and a second flange end portion opposite the first flange end portion, and wherein the elongated flange portion extends outwardly of the flat body portion along one edge of the flat body portion between the first and second end portions.

9. The apparatus according to claim 8, wherein the first attachment feature comprises at least two first holes and the second attachment feature comprises at least two second holes, and wherein one first hole is located at the first flange end portion, another first hole is located at the second flange end portion, and the at least two second holes are located in the enlarged central portion of the flat body portion.

10. An apparatus, comprising:
    a body inner structure;
    a quarter panel attached to the body inner structure;
    a bracket having at least one first hole to receive a first fastener to attach the bracket to the quarter panel and at least one second hole to receive a second fastener to attach the bracket to the body inner structure; and
    a BLIS module attached to the body inner structure without covering the first fastener.

11. The apparatus according to claim 10, wherein the at least one first hole comprises at least two first holes that receive first fasteners to secure the bracket to the quarter panel, and wherein the at least one second hole comprises at least two second holes that receive second fasteners to secure the bracket to the body inner structure.

12. The apparatus according to claim 10, wherein the bracket comprises a flat body portion extending between first and second end portions and with an enlarged central portion between the first and second end portions, and wherein the bracket includes an elongated flange portion having a first flange end portion and a second flange end portion opposite the first flange end portion, and wherein the elongated flange portion extends outwardly of the flat body portion along one edge of the flat body portion between the first and second end portions.

13. The apparatus according to claim 12, wherein the first attachment feature comprises at least two first holes and the second attachment feature comprises at least two second holes, and wherein one first hole is located at the first flange end portion, another first hole is located at the second flange end portion, and the at least two second holes are located in the enlarged central portion of the flat body portion.

14. The apparatus according to claim 10, wherein the quarter panel can be removed from the bracket and the body inner structure without having to remove the bracket from the body inner structure.

15. The apparatus according to claim 10, wherein the BLIS module covers at least a portion of the second attachment feature.

16. A method, comprising:
(a) attaching a quarter panel to a bracket via a first attachment feature;
(b) attaching the quarter panel with the bracket to a body inner structure;
(c) attaching the bracket to the body inner structure via a second attachment feature, and
(d) attaching a BLIS module to the body inner structure without covering the first attachment feature.

17. The method according to claim 16, including, subsequent to step (d), removing the quarter panel from the body inner structure without having to remove the BLIS module from the body inner structure.

18. The method according to claim 16, wherein step (a) further includes forming the first attachment feature as at least two first holes to receive first fasteners to attach the bracket to the quarter panel, and wherein step (c) further includes forming the second attachment feature as at least two second holes to receive second fasteners to attach the bracket to the body inner structure.

19. The method according to claim 18, including
forming the bracket as a flat body portion extending between first and second end portions and with an enlarged central portion between the first and second end portions, and
forming the bracket with an elongated flange portion having a first flange end portion and a second flange end portion opposite the first flange end portion, and such that the elongated flange portion extends outwardly of the flat body portion along one edge of the flat body portion between the first and second end portions.

20. The method according to claim 19, including forming one first hole at the first flange end portion, forming another first hole at the second flange end portion, and the positioning the at least two second holes in the enlarged central portion of the flat body portion.

* * * * *

UNITED STATES PATENT AND TRADEMARK OFFICE
CERTIFICATE OF CORRECTION

PATENT NO. : 10,967,913 B2
APPLICATION NO. : 16/553609
DATED : April 6, 2021
INVENTOR(S) : Jack Marchlewski, Darrin Neil Wagner and Robert Reiners It is certified that error appears in the above-identified patent and that said Letters Patent is hereby corrected as shown below:

In the Claims

In Claim 13, Column 6, Line 60-61; replace "the first attachment feature" with --the at least one first hole--

In Claim 13, Column 6, Line 61-62; replace "the second attachment feature" with --the at least one second hole--

In Claim 15, Column 7, Line 6-7; replace "the second attachment feature" with --the at least one second hole--

In Claim 20, Column 8, Line 19; replace "the positioning" with --positioning--

Signed and Sealed this
Twentieth Day of September, 2022

Katherine Kelly Vidal
*Director of the United States Patent and Trademark Office*